No. 767,432. PATENTED AUG. 16, 1904.
T. McL. PARK.
AUTOMATIC LOADING DEVICE.
APPLICATION FILED SEPT. 10, 1903.
NO MODEL. 6 SHEETS—SHEET 1.
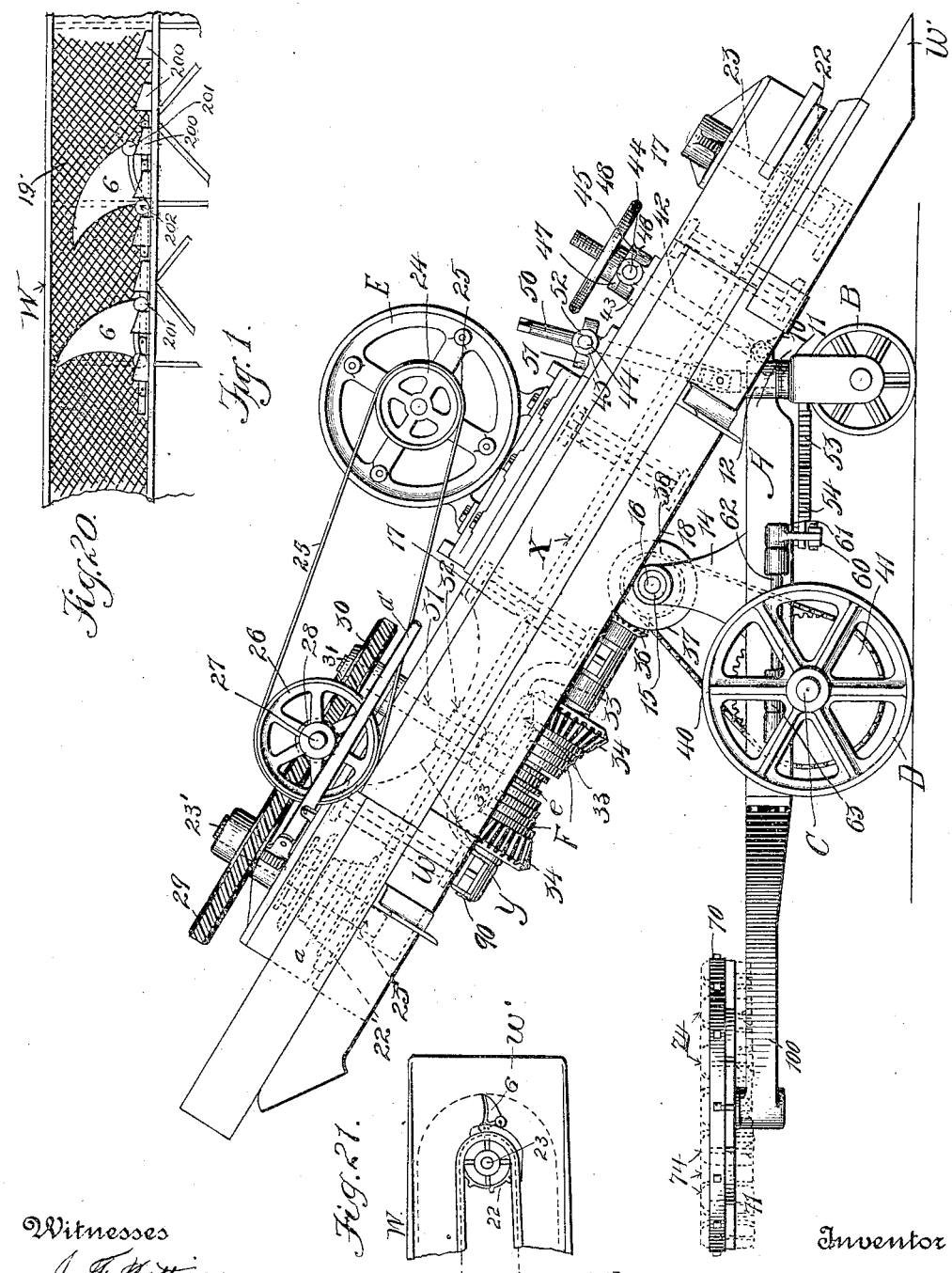
Witnesses
Inventor
Thomas McL. Park.
by T. Walter Fowler
Attorney

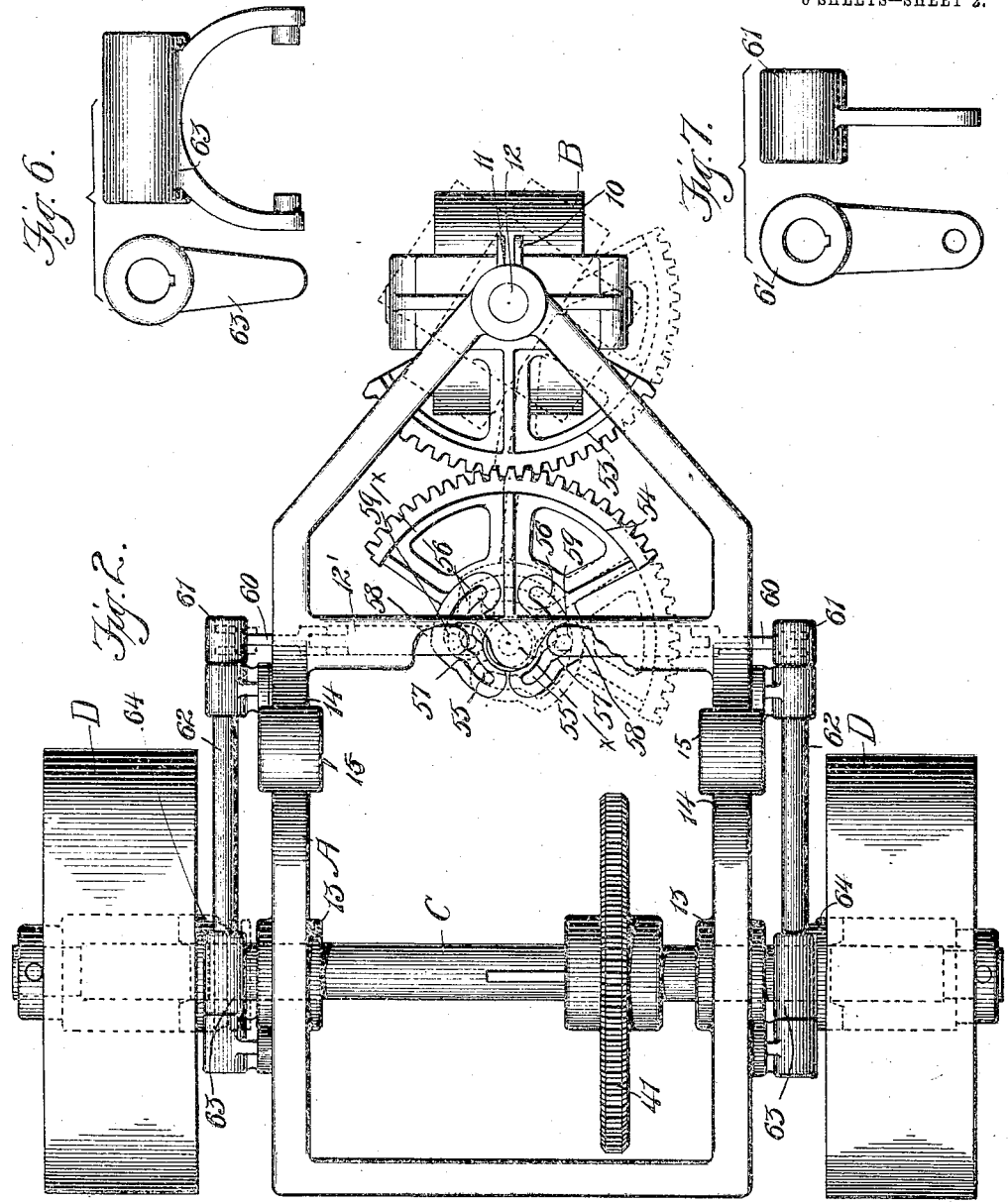

No. 767,432. PATENTED AUG. 16, 1904.
T. McL. PARK.
AUTOMATIC LOADING DEVICE.
APPLICATION FILED SEPT. 10, 1903.
NO MODEL. 6 SHEETS—SHEET 3.
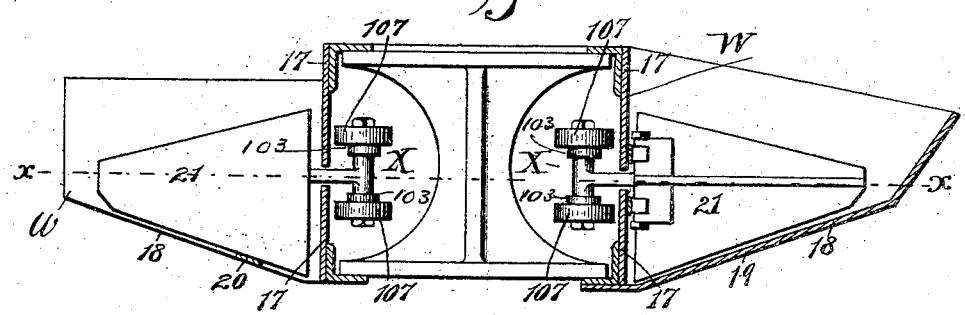
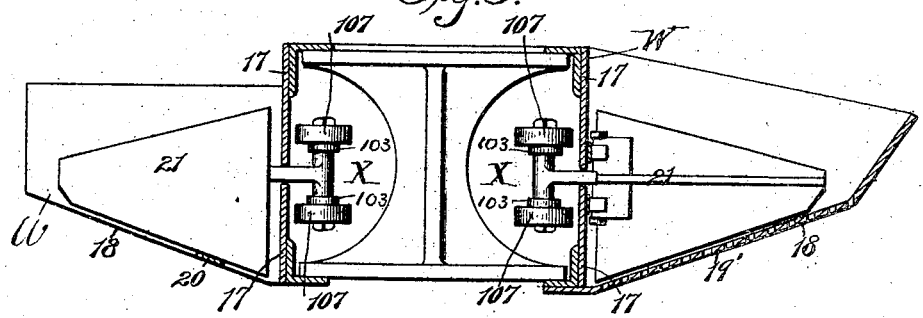
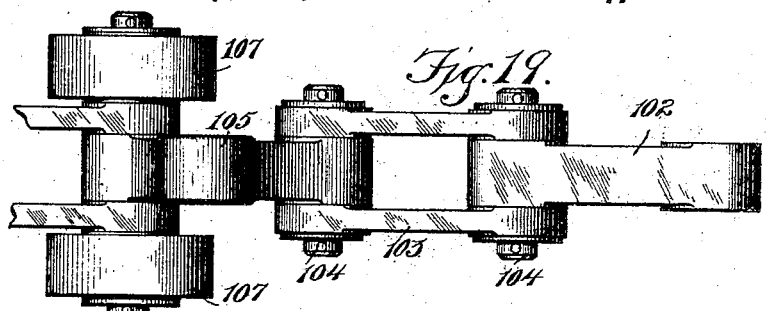
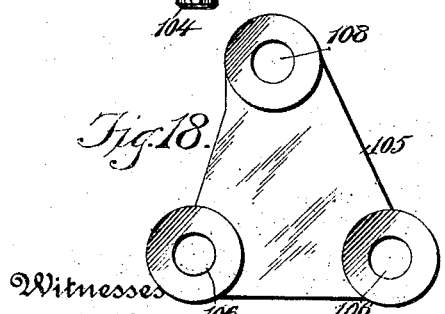
Inventor
Thomas McL. Park
by T. Walter Fowler
Attorney
Witnesses
J. F. Pattison
Chapman W. Fowler

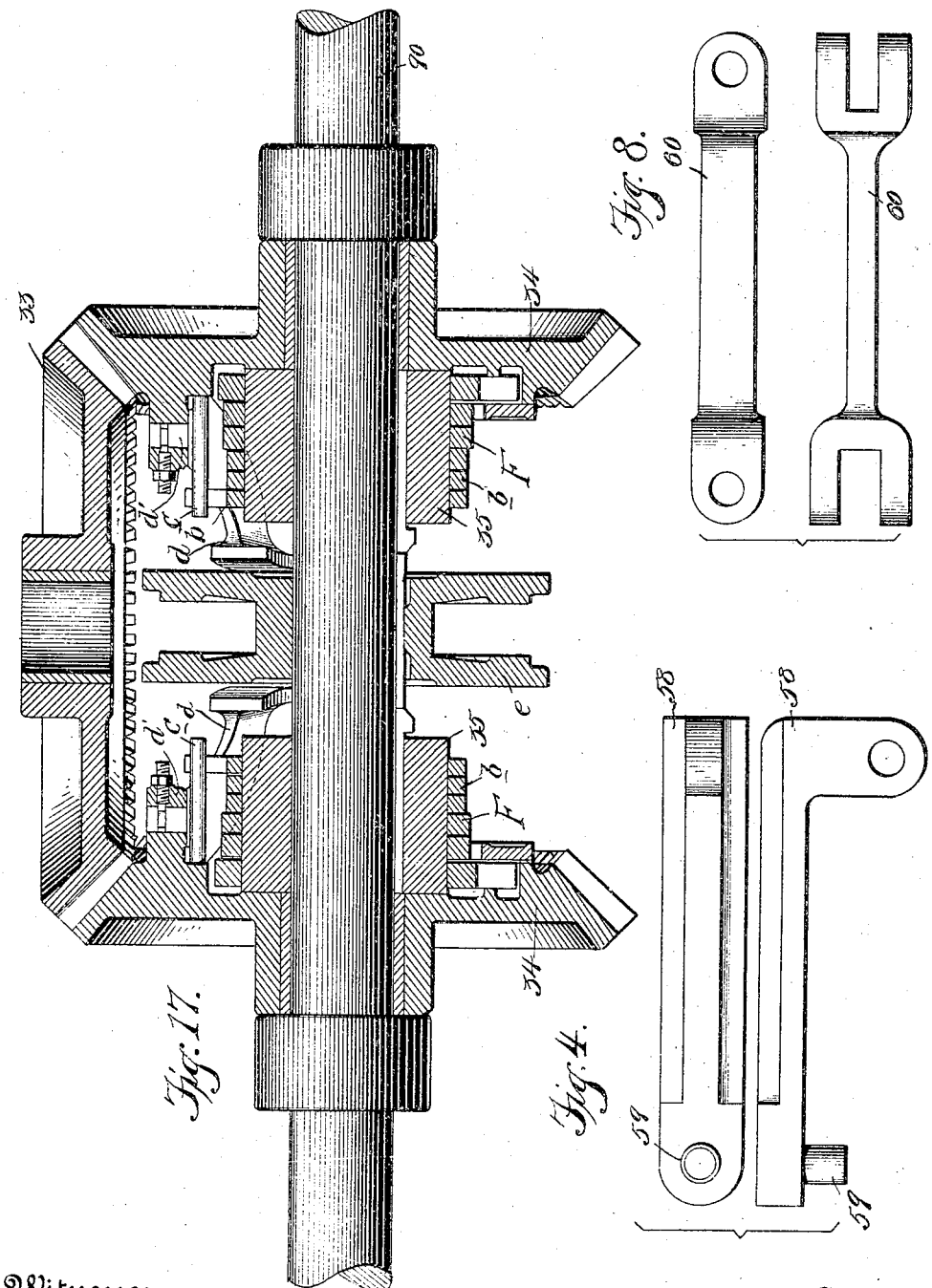

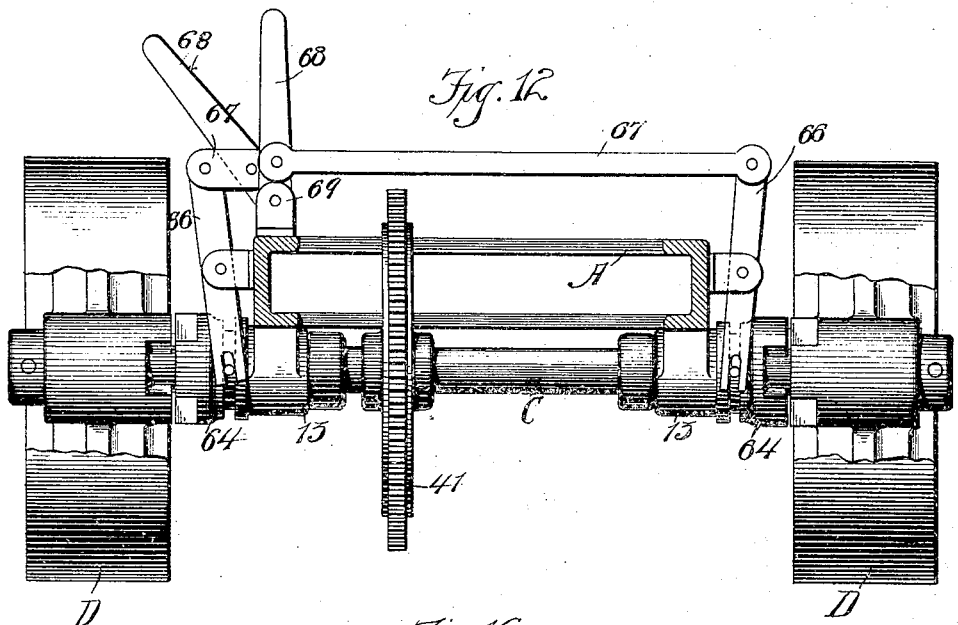
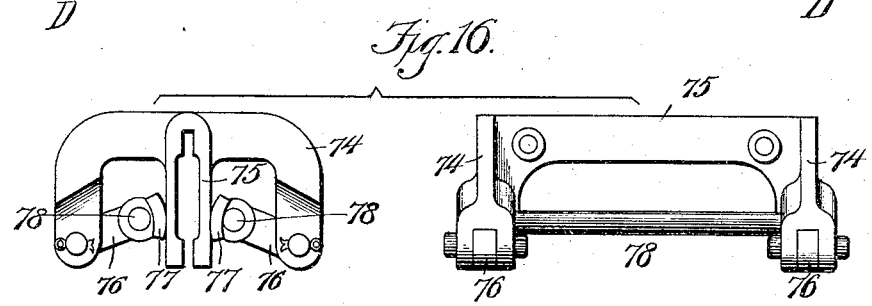
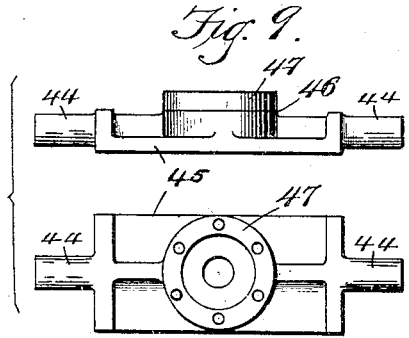
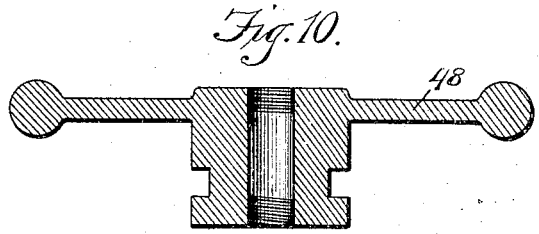

No. 767,432. PATENTED AUG. 16, 1904.
T. McL. PARK.
AUTOMATIC LOADING DEVICE.
APPLICATION FILED SEPT. 10, 1903.
NO MODEL. 6 SHEETS—SHEET 6.

Witnesses
J. F. Pattison
Chapman H. Fowler

Inventor
Thomas McL. Park
by T. Walter Fowler
Attorney

No. 767,432. Patented August 16, 1904.

UNITED STATES PATENT OFFICE.

THOMAS McLEAN PARK, OF CHICAGO, ILLINOIS, ASSIGNOR TO PARK MANUFACTURING COMPANY, OF CHICAGO, ILLINOIS, A CORPORATION OF ILLINOIS.

AUTOMATIC LOADING DEVICE.

SPECIFICATION forming part of Letters Patent No. 767,432, dated August 16, 1904.

Application filed September 10, 1903. Serial No. 172,595. (No model.)

*To all whom it may concern:*

Be it known that I, THOMAS MCLEAN PARK, a citizen of the United States, residing at Chicago, in the county of Cook and State of Illinois, have invented new and useful Improvements in Automatic Loading Devices, of which the following is a specification.

My invention relates to certain new and useful improvements in machines adapted to load ore or other rock as it is ordinarily blasted from the breast of a tunnel up into cars and for the loading of ore, gravel, coal, grain, or other material upon cars, wagons, or other vehicles or places of storage.

My invention is also adapted for the convenient and effective sacking of grain, salt, or other granular or fine material which has been elevated by the loader.

The present invention in its general scope and purposes and in the operations of the several mechanisms follows more or less closely the inventions set forth in my prior patents, Nos. 720,840 and 720,960, dated February 17, 1903, but which prior patented constructions are improved to increase the effectiveness and general utility of the machine, the essential object of which is to provide means which will supersede hand-shoveling wherever possible, especially in mining and excavating operations and for loading mined or other material upon cars or wagons.

The present invention consists of the parts and the constructions, arrangements, and combinations of parts which I will hereinafter describe and claim.

Figure 13:
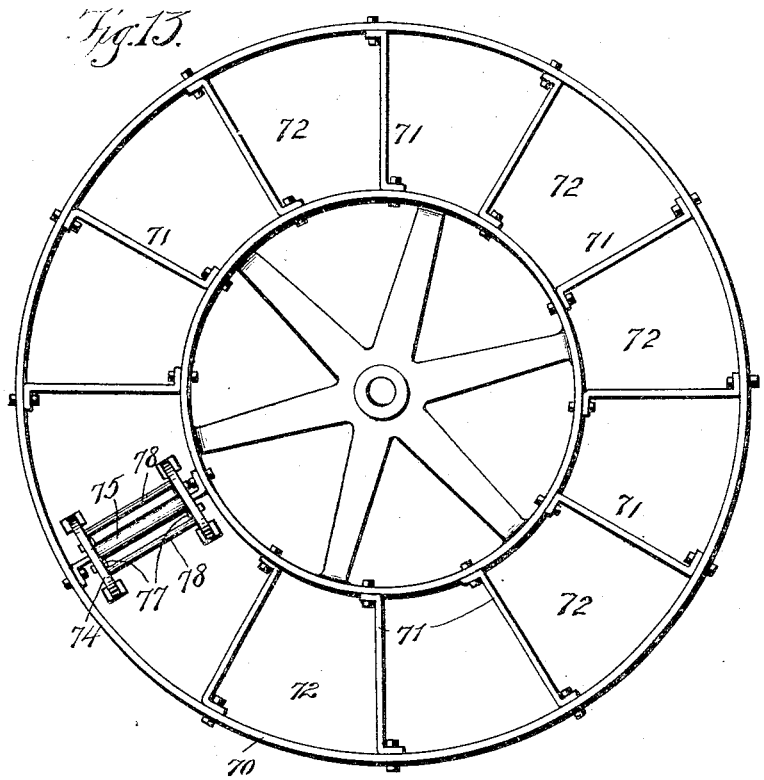
Figure 14:
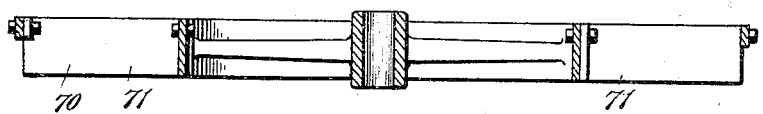
Figure 15:
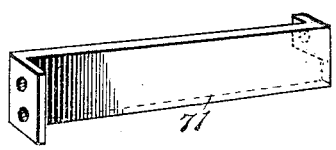

In the accompanying drawings, forming part of this invention, and in which similar characters of reference indicate like parts throughout the several views, Figure 1 is a side elevation of a loading device embodying my invention. Fig. 2 is a plan view of the wheeled truck detached. Fig. 3 is a cross-section of the conveyer. Fig. 3ª is a modification of the same. Fig. 4 represents side and plan views of the cam-actuated rods. Fig. 5 is a reduced section of the clutch-actuating cams on the line *x x* of Fig. 2. Fig. 6 represents views of the rear-axle clutch-fork. Fig. 7 is a detail of the lever 61. Fig. 8 represents views of the connecting-rod 60. Fig. 9 represents views of the saddle 45. Fig. 10 is a section of the hand-wheel. Fig. 11 is a plan view of the split collar 47. Fig. 12 is a rear-axle clutch mechanism of modified form. Fig. 13 is a plan view of the sacking-wheel. Fig. 14 is a sectional view of the same. Fig. 15 is a detail of one of the division-plates 71. Fig. 16 represents side and end views of a sack-holder. Fig. 17 is an enlarged detail of one of the coil-clutches. Figs. 18 and 19 are enlarged details of the conveyer-chain. Fig. 20 represents the cams for moving the blades to agitate the material carried thereby. Fig. 21 is a detail of the front or shovel end of the machine.

In the said drawings, A represents generally a wheeled carriage or truck of suitable design, but having, preferably, a substantially rectangular form with converging sides at the front, which front is forked at 10 for a purpose I will hereinafter indicate and is provided with a hub or bearing 11 for the vertical shaft 12 of a yoke, between the arms of which the shaft of front steering-wheel B is appropriately mounted. The truck-frame is preferably, although not necessarily, made of channel iron or steel, and the side portions are connected by a transverse bar or beam 12', whereby the frame is made rigid and capable of supporting the superstructure, which I will presently describe. At the rear portions the sides of the truck-frame are provided with suitable journal-boxes 13, in which the journals of the rear axle C are appropriately mounted, said axle carrying the bearing and driving wheels D. In addition to the foregoing the truck-frame has rising from its sides at points near the longitudinal center the standards 14, the upper portions of which are bored or formed to provide bearings 15 for ends of the transverse shaft 16, which furnishes the axial support for the upper structure of the loader. The said upper structure includes a conveyer-frame W, made, preferably, of two main channel-pieces 17, the general construction of which is set forth in my prior patents and a cross-section of which appears in Fig. 3, where the conveyer-frame is shown as having side troughs 18 extending outwardly and with upwardly-inclined lower portion leading from the lower corners or portions of the channel-pieces of the frame, said troughs having their outer sides turned upwardly and made sufficiently stiff or rigid to resist the pressure of the material being conveyed. One of the troughs will preferably be provided with a bottom 19, which may be closed, as shown in Fig. 3, or which if any screening or separation of fine from coarse material is desired may be provided with an appropriate screen-surface, as shown at 19' in Fig. 3ª. The other trough may be open at the bottom except for a bar 20 or equivalent means forming a support for the return of the empty blades, or brackets, or buckets, or other carrying element of the conveyer. This conveyer X is of the endless-chain type, as disclosed in my said former patents, and its blades 21, which operate in the troughs, have their shanks extending through the slotted or channeled sides of the conveyer-frame W and connect with the chain, substantially as shown in Fig. 3. The conveyer-frame is so mounted at its central portion upon the transverse shaft 16 that it may be tilted longitudinally in vertical planes, whereby the forward end of the conveyer-frame may be brought sufficiently low to cause the apron end W' thereof to scoop into the material to be elevated, whereby said material may be caught by the endless chain of buckets or blades and carried upward through the trough and over the floored portion thereof, or over the screened surface if such surface is used and screening of the fine material is desired, the said material being finally discharged at the rear or upper end of the conveyer-frame into cars or wagons direct, or into a supplemental conveyer, which in turn delivers to the cars or wagons. As the blades or buckets deliver their load they return through the other or open-bottom trough, being supported upon the bar 20 during this return movement. The apron end W' of the conveyer-frame serves as a shovel-nose, which is forced into or under the material and in so doing will gather the same into the receiving end of the conveyer-trough, for in the operation of the machine the shovel-nose or apron end of the conveyer-frame, which is shaped substantially as shown, is placed with the shovel-nose portion in close proximity to the pile of material to be gathered, the conveyer started, the machine moved forward with a sort of sweeping action, and the nose urged into or under the material, and the material thus gathered will be fed into the range of action of the flights and finally carried by the flights along the trough. The conveyer passes around suitable sprocket-wheels 22 22' at the ends of the conveyer-frame, said sprockets being mounted on shafts 23 23', which stand perpendicular to the bottom of said frame. Between the shaft 23' and the loose sprocket carried thereby is a clutch $a$, which may be of any well-known character operated by means of the fulcrumed lever $a'$. The clutch shown is what is known as the "coil-clutch." (Illustrated somewhat in detail in Fig. 17, but forming no essential part of the invention.) Any suitable clutch at the point indicated may be employed for connecting the driving-sprocket of the endless conveyer with the power and disconnecting it from the power to start and stop the travel of the conveyer.

The shaft 23' is connected with the power which operates the endless conveyer and also feeds the apparatus forward or backward as circumstances require, this power being derived from a suitable electric or other motor E, whose case or frame is bolted or otherwise secured to the upper portion of the tilting frame, said motor having in the present instance its driving-shaft arranged transverse of the said frame and provided with an end pulley 24, from which a belt 25 runs to a pulley 26 on a shaft 27, carrying a worm 28, which meshes with and drives the worm-wheels 29 30, one of which, 29, is fixed to the shaft 23' of one of the sprocket-wheels, while the other worm-wheel is fixed to a shaft 31, mounted in an appropriate bearing 32 in a frame or casting Y, bolted to the tilting frame, said shaft 31 having fixed to its lower end a bevel-gear 33, adapted to engage the bevel-gears 34, which are loose upon the shaft 90 and are adapted to be connected to sleeves 35, keyed upon said shaft through the medium of any suitable clutch mechanism—as, for instance, the coil-clutch F shown in Fig. 17—whereby the power of the bevel gear-wheel 33 is transmitted through one or the other of the bevel-gears 34 to rotate the shaft 90 either to the right or left, according as the machine is to be fed forward or backward, for the power of the said shaft is transmitted to the rear axle of the wheel-truck through the medium of a bevel-pinion 36 on the end of said shaft 90, engaging a bevel-wheel 37 on the transverse shaft 16, which latter shaft carries a sprocket-wheel 38, from which a sprocket-chain 40 runs to a sprocket-wheel 41 on the said rear axle, as shown in Fig. 1.

The coil-clutch is shown in Fig. 17 and is of a well-known type and forms no essential part of my invention, although a clutch of this type is well suited for my purpose. Any other suitable and well-known form of clutch may be substituted, however, for the coil-clutch without departing from the spirit of my invention. The coil-clutch, as is well known, includes the sleeve 35, keyed to the shaft 90 and circumferentially embraced by a torsional spring $b$, one end of which is secured to the face of the bevel-wheel 34, while the other end is in engagement with the arm or part c of a curved lever d, the shank or stem of which is swiveled or journaled in a bearing in the gear, said lever adapted to be engaged by the shifting collar e. In Fig. 17 this collar e is disposed between the pair of clutches, and when moved in either direction it contacts with one or the other of the levers d and rocks this about its bearing d', and thereby causes the arm or part c to bear upon the end of the spring and coil the same into close frictional contact with the sleeve 35, and thus operatively engage the loose gear with the shaft 90. When the sliding collar is moved out of engagement with the rocking lever, the spring uncoils and the engagement of the normally loose bevel-gear with the shaft is broken. The arrangement of gears and coil-clutch, as shown in Fig. 17, forms a reversing mechanism for changing the direction of travel of the machine or reversing the movement of the driven shaft.

To facilitate the adjustment of the tilting frame, I pivotally secure between the forks 10 on the converging front end of the truck-frame an eyebolt 42, which extends upwardly through the tilting frame, as shown in Fig. 1, and on the top of said frame I bolt or otherwise fixedly secure the journal-boxes 43, the bearings of which receive the trunnions 44 of the saddle 45, Fig. 9, which has a flange 46, to which a split collar 47 is bolted. The eyebolt passes through the said saddle and collar and also through the hub of a hand-wheel 48, said hub provided with a circumferential groove in which the split collar fits, thereby uniting the two. The upper end of the eyebolt is threaded, and the hand-wheel works on this threaded portion, and when said wheel is turned the frame is tilted about the transverse shaft 16 and the front or lower end raised or lowered, according to the direction in which said wheel is moved.

Referring to Figs. 1 and 2, it will be seen that the yoke or fork of the front or steering wheel has a hub through which passes a shaft or bolt 12, to the upper end of which is pivotally connected a rod or shaft 50, which passes through a saddle 51, substantially like the saddle 45 before described and which is mounted in bearings at 52, said rod or shaft 50 having its upper end squared to receive a lever (not shown) which may be operated to rotate the rod or shaft to turn the yoke or fork and front steering-wheel either to the right or left, as circumstances require. The yoke or fork of the front steering-wheel is also cast or otherwise made rigid with a segmental gear 53, which when in position extends horizontally beneath the frame or wheeled truck, said segmental gear meshing with a second segmental gear 54, provided with cam-grooves 55 56 and a centrally-located hub. The cam-grooves 55 56 are both struck from the center of the hub, but are made on different radii, and their inner portions are joined by straight portions 57, which are essentially tangential to said hub, as shown in Fig. 2. These cam-grooves operate the oppositely-extending bars or rods 58, which extend transversely beneath the cross-bar of the wheeled truck-frame. One end of each of these rods or bars 58 is provided with an antifriction-roller 59, which operates in the cam-grooves, and the opposite or outer end of each of said rods or bars is pivotally united to one end of a connecting-rod 60, whose opposite end is pivotally connected to a lever 61, fixed to the end of a journaled rock-shaft 62, extending horizontally along the wheeled truck-frame, as shown in Fig. 1, and having its opposite end provided with a clutch-fork 63, Fig. 6, adapted to engage and actuate a clutch at 64. These clutches, of which there is one at each side of the machine and located upon the rear axle of the truck, may be of any well-known type and are so arranged that one or the other of them is operated to assist the machine, turning to the right or left. In the normal condition of the parts the antifriction-rollers 59 stand in the position shown in Fig. 2, and when the front steering-wheel is turned in one direction the segmental gear 53 causes the other gear 54 to turn in an opposite direction. This results in one of the rods or bars 58 and connections being operated to rock the shaft 62 at one side of the machine and throw the clutch 64 at that side out of engagement with the rear axle, while the clutch at the opposite side remains in engagement to assist the turning of the machine in the desired direction. In other words, the arrangement of the pair of cams 55 56 is such that when the front wheel is turned to the left the connections described will disconnect the clutch of the left hind wheel, so that it will remain idle, while the right hind wheel remains in clutch and will turn the machine in complete circle or any part thereof. This arrangement saves the manipulation of many levers for accomplishing the desired and necessary movement. Ordinarily two extra levers are required for the purpose; but these are dispensed with in the present arrangement, and the only lever used is the one that fits the upper end of the rod or shaft which actuates the front steering-wheel.

In Fig. 12 I show a modified form of clutch-actuating mechanism and wherein the rear axle-clutches are operated by centrally-fulcrumed levers 66, the upper ends of which are pivotally connected to links or rods 67, which in turn are pivotally connected to hand-levers 68, fulcrumed at their lower ends, as at 69. In this instance the operation of either hand-lever disconnects one of the clutches and allows the other to operate substantially in the manner before described.

In some instances, as when loading grain, salt, and like material, it is desirable to sack the material. Therefore in Figs. 1 and 13 I show the discharge end of the loader associated with a sacking mechanism whereby the discharge from the loader is delivered directly into the open mouths of suitable sacks. This sacking mechanism is supported upon an extension 100 of the wheeled truck-frame, upon which extension is rotatably mounted a horizontal wheel 70, consisting, preferably, of a central spider and inner and outer bands connected by radial plates 71, whose ends are flanged and bolted to said bands. These not only support the bands, but they divide the space between the bands into pockets 72, into which the material discharging from the loader is directed either directly or through the intervention of a chute or the usual hopper with discharge-spout. The sack-holders are substantially of I form in plan view and each consists of end members 74, joined by a centrally-located longitudinally-extending bar 75, which is slotted from below, so that it may straddle one of the radial plates or divisions 71 of the wheel 70, to which the said slotted bar is secured in any well-known manner. When the sacking device is in position, the end heads thereof lie upon each side of the division-plate, and each of said heads is provided with means for clamping one side of the sack. These means consist of upwardly-inclined arms 76, pivotally mounted in the lower portions of the end heads and extending inwardly toward the longitudinal bar 75, and each is provided with a pivoted clamp 77, between the face of which and the adjacent face of the bar 75 the edge of one side of the mouth of the sack is drawn and then securely held by the clamping action due to the weight of the sack tending to pull the inclined arms downward into a horizontal position. The arms and clamps at each side of the sack-holder are connected in pairs by means of a longitudinally-extending rod 78, which when pulled upon in an upward direction causes both arms and clamps at that side to be lifted to release the side of the sack engaged thereby. As each of the radial division-plates of the wheel 70 will be provided with one of the sack-holders and as each of the latter projects each side of the plate and has two pairs of clamps, (one pair at each side,) it will be manifest that the sack is held at one side by the right-hand pair of clamps of one sack-holder and at the opposite side by the left-hand pair of clamps of the next adjacent sack-holder, the sack being thus suspended centrally with its mouth open in space or pocket 72 between an adjacent division-plate of the wheel. As the wheel rotates the sacks are brought successively beneath the discharge end of the loader and are filled and when filled are released by the operator grasping the rods 78 of the engaged pairs of clamps and pulling upward to remove the clamps from their engagement with the bar 75, and thereby release the sack which has been held between said bar and clamps.

As the extension-frame 100 is bolted to the rear of the truck, it may be readily removed when its use is not required to enable a car or other receptacle to be brought up close to the track and beneath the discharge end of the conveyer.

In Figs. 18 and 19 I show a part of the conveyer-chain and the details thereof. The chain of Figs. 3 and 3ª is shown with a bearing somewhat longer than what is shown in Fig. 19, which is an enlarged detail showing the form of chain I prefer to use. This chain consists, preferably, of center bars 102 and side bars 103, with pins or bolts 104 pivotally uniting the parts. At suitable points in the chain and forming a component part thereof I also place the links 105, which are substantially triangular shaped, as shown in Fig. 18, and provided with bolt-holes 106, through which the pins or bolts 104 pass to secure this base portion of the link 105 between the inner side of the side bars 103, certain of said pins 104 being extended beyond the outer sides of the side bars and provided with rollers 107, adapted to travel against the inner wall of the conveyer-trough, and thereby lessen the friction of the chain. The links 105 serve for the attachment of the shovels or blades, and said links are provided with a third bolt-hole 108, located near the apex of the triangular link, but which bolt-hole is made in a plane slightly in rear of the roller-pin, so that when the point of the shovel or blade meets an obstruction the chain has a tendency to buckle, thus forming a cushion instead of making a solid pull.

The pivoted blades 21 of the conveyer may have the general form shown in my said former patent, No. 720,840, and when used in connection with the screening before alluded to I may employ a series of cams or inclines 200, as shown in Fig. 20, and which are located along the carrying side of the conveyer-frame, so that as the blades pass along the trough their heel portions 201 strike the successive cams, and the blades rock about their pivotal connection 202 with the conveyer-chain, and the outer portions serve to agitate the material carried by the blades, and thus assist in screening the material as it is carried along the screen-surface. The cams are preferably so arranged that they can be removed when the screening of the material is not required.

Having thus described my invention, what I claim as new, and desire to secure by Letters Patent, is—

1. In a machine of the character described, the combination of a wheeled truck or frame having two rear bearing-wheels and a centrally-located steering-wheel; a conveyer-frame tiltably mounted on the truck; a conveying mechanism in said tilting frame; and comprising an endless flight-conveyer having its going and return sections in the same transverse plane, said conveyer frame having its front end adapted to be moved horizontally into or beneath the material to be conveyed and means whereby the steering-wheel may be turned about its support to change the direction of travel of the truck.

2. In a machine of the character indicated the combination of a wheeled truck or frame having a forwardly-converging front end; bearing-wheels at the rear of said frame; a swiveled steering-wheel at the converging front end of the frame; a conveyer-frame tiltably mounted above the wheeled frame; and an endless conveyer mounted in the tiltable frame and having an endless flight conveyer whose going and return sections lie in substantially the same horizontal plane.

3. In a machine of the character described the combination of a truck or frame; a conveyer-frame tiltably mounted thereon; an endless conveyer mounted in the tilting frame; means for operating the conveyer; and means for tilting the conveyer-frame comprising a rod or bolt pivoted to the truck or frame and passing through the tilting frame; a rocking saddle and journal-bearings therefor; said saddle receiving said rod or bolt and the latter threaded at its upper end; and a hand-wheel operatively engaging the said threaded portion of the rod or bolt.

4. In a machine of the character described the combination of a truck or frame having a converging front end provided with lugs or forks; a rear axle provided with bearing-wheels; a front steering-wheel swiveled in the converging front of the truck; a frame tiltably mounted upon the truck; an endless conveyer within said tilting frame; and means for adjusting the inclination of the tilting frame consisting of an eyebolt pivoted between the forks at the front of the truck-frame, journal-boxes on the tilting frame, a saddle having journals to fit said boxes, and having a hub or bearing to receive said eyebolt, a split collar or ring secured to the saddle and a hand-wheel swiveled to said ring and internally threaded to operatively engage a threaded portion on the eyebolt.

5. In a machine of the character described, the combination of a truck-frame having vertical standards at the central portions of its sides, and having a converging front end; a rear axle and bearing-wheels thereon; a single steering-wheel at the front of the frame; a tiltable conveyer-frame pivoted to the standards and means for turning said steering-wheel consisting of a yoke in which the wheel is mounted; a stem extending from the yoke; a rod or shaft pivoted to the stem and extending vertically through tilting conveyer-frame; a rocking saddle through which the stem passes; journal-bearings for the saddle, and a lever on the upper end of the rod or shaft for turning the same.

6. In a machine of the character described, the combination of a supporting-frame; a rear axle and supporting-wheels thereon; power devices for rotating said axle; a conveyer-frame tiltably mounted on the supporting-frame; an endless conveyer within the tiltable frame; means for operating the conveyer; and means for changing the direction of travel of the truck including a front steering-wheel; clutch mechanism for each rear supporting-wheel and normally in engagement with the power-driven rear axle; and connections between the steering-wheel and said clutches whereby when the direction of the former is changed one of the clutches is disengaged from the driven axle while the other clutch remains in action to assist the turning of the machine.

7. In a machine of the character described the combination with a conveyer-frame and complementary conveying mechanism, of a supporting frame or truck having a power-driven rear axle and bearing-wheels loose thereon; a clutch mechanism between said axle and each of said rear supporting-wheels and capable of connecting the latter with the former; a wheel-support at the front of the truck-frame; and means disconnecting either of the clutches from the adjacent supporting-wheel when the machine is to be turned.

8. In a machine of the character described the combination with a tiltable conveyer-frame and conveying devices arranged therein, of a truck-frame upon which the conveyer-frame is mounted, a driven rear axle for the truck-frame, bearing-wheels loose on said axle, a clutch mechanism between each of said bearing-wheels and said axle, a swiveled wheel-support at the front of the truck-frame, and connections between the said front wheel-support and the clutches whereby the latter are controlled by the former.

9. In a machine of the character described, the combination with a tilting conveyer-frame and conveying mechanism arranged therein, of a truck-frame upon which the conveyer-frame is mounted, a driven rear axle for the truck-frame, bearing-wheels loose on said axle, a clutch mechanism between each of said wheels and the axle, a rock-shaft along each side of the truck-frame, yokes connecting said shafts with the clutches; a swiveled yoke at the front of the truck-frame and provided with a steering-wheel, a segmental gear fixed to the yoke, a second segmental gear in engagement with the first-named gear and turnably mounted, said second gear provided with cam-grooves, oppositely-extending transverse levers or bars having one end operatively engaging the cam-grooves, and connections between the outer ends of the levers or bars and the said rock-shafts whereby the turning of the steering-wheel yoke or frame in either direction actuates one of the rear-axle clutches to disengage one of the rear wheels from the driving power of its axle.

10. In a machine of the character described the combination with a wheeled frame or truck, a conveyer-frame tiltably mounted thereon, and conveying mechanism in said conveyer-frame, of a motor on the conveyer-frame, a shaft journaled vertically in the conveyer-frame, connections between said shaft and the motor whereby the former is driven by the latter, a gear-wheel on said shaft, a shaft disposed substantially at right angles to the vertical shaft and provided with a pinion, gear-wheels normally loose on said second shaft and driven by the first-named gear-wheel, a gear-wheel engaged by said pinion, a sprocket-wheel on the axis of the last-named gear-wheel, a sprocket-wheel on the rear axle of the truck-frame, a sprocket-chain extending between said sprocket-wheels, and a reversing-clutch mechanism between the second-named shaft and the loose gears whereby the truck-frame may be moved forward or backward.

11. In a machine of the character described, the combination with a wheeled truck, a conveyer-frame, a transverse shaft carried by the truck and upon which the conveyer-frame is tiltable, and conveying mechanism in said tiltable frame, of a motor, a shaft parallel with the conveyer-frame and provided with a bevel-pinion, a bevel-gear on the said transverse shaft connections between said last-named shaft and the rear axle of the truck, a vertical shaft journaled in the conveyer-frame and provided with a bevel-gear, connection between the motor and the vertical shaft for operating the latter, a bevel-gear loose on the first-named shaft and in operative connection with the bevel-gear on the vertical shaft, a clutch for connecting said loose gear with said first-named shaft, for rotating the latter in one direction, a second bevel-gear loose on the said first-named shaft and a clutch between said second gear and the said shaft for rotating the latter in a reverse direction.

12. In a machine of the character described the combination of a wheeled truck, a shaft extending transversely above the same, a conveyer-frame tiltably mounted on the shaft said shaft provided with a bevel-gear and sprocket-wheel, a sprocket-wheel on the rear axle of the truck and a chain connecting the two sprocket-wheels, a shaft extending longitudinally of the conveyer-frame and sleeves fixed thereto, inward-facing bevel-gears loose on said shaft, coil-clutches between the bevel-gears and sleeves, a sliding collar between said clutches for connecting either of the bevel-gears with its adjacent sleeve whereby the shaft may be rotated in reverse directions to impart a forward or backward movement to the truck, a vertical shaft journaled in the conveyer-frame and provided with a bevel-gear in engagement with said loose gears, a worm-wheel on said vertical shaft, a worm-shaft engaging the worm-gear, a motor on the conveyer-frame, and driving connections between the motor and the worm-shaft.

13. The combination in an organized machine of the character described of a wheeled truck; a conveyer-frame tiltably mounted thereon; conveying mechanism in said frame; and comprising an endless flight conveyer whose going and return sections lie in substantially the same horizontal plane said conveyer-frame having its front end adapted to be forced horizontally into or beneath the material to be conveyed, power devices for operating the conveying mechanism; power-transmitting mechanism for imparting rotation to the rear axle of the truck whereby the apparatus is self-propelled, and a reversing-clutch mechanism interposed in the last-named power-transmitting mechanism whereby the direction of rotation of the said rear axle may be reversed.

14. In a machine of the character described the combination of a tiltable frame; and support therefor; an endless conveyer in said frame, sprocket-wheels over which the conveyer passes, a motor disposed transversely of the conveyer-frame, a worm-shaft also transverse of the frame, a worm-wheel driven by said worm-shaft said wheel mounted on the shaft of one of said sprocket-wheels, connections between the motor and worm-shaft and a clutch mechanism on said sprocket-wheel shaft for connecting and disconnecting said shaft with the power.

15. In a machine of the character described, the combination of a support, a conveyer-frame pivotally mounted thereon, a trough along the side of the frame and having a screen-section, an endless conveyer operating along the trough and provided with flights, and means for agitating the flights during their travel over the screen-section.

16. In a loading apparatus, the combination with a truck-frame, a conveyer-frame pivotally mounted above the same, an endless conveyer operating in the conveyer-frame, a rear extension of the truck-frame and a sacking mechanism supported upon said extension below the discharge end of the conveyer-frame.

17. In a loading apparatus, the combination with a supporting-frame, a removably-secured rear extension of the supporting-frame, a conveyer-frame tiltably mounted on the supporting-frame, and an endless conveyer in said frame, of a sacking mechanism carried by the extension of said support and receiving the material discharged from the conveyer.

18. In a loading device the combination with the conveyer-frame, and a chain conveyer composed of pivoted bars, and shovels or blades, of links for attaching the shovels or blades to the chain said links forming a part of the chain and provided with holes for the pivot-pins thereof, and rollers mounted on certain of the pivot-pins, said links extending outwardly and provided with means for attaching the shovels or blades at a point behind the roller-pin of the link.

19. In a conveyer, a conveyer-chain composed of side and intermediate bars, and pins pivotally uniting the same, and substantially triangular-shaped links having a pair of holes at the base of the triangle adapted to receive the pivot-pins, certain of said pins provided with rollers, said links having a third hole located in a plane in rear of the roller-pin of the link, and shovels or blades secured to the last-mentioned portion of the links.

20. The combination with a wheeled support, of a conveyer-frame thereon and pivotally mounted between its ends and having an endless flight conveyer whose going and return sections are in substantially the same horizontal plane, said conveyer-frame having its forward end extended parallel with its longitudinal axis and in advance of the range of action of the flights whereby said extended portion forms a shovel-shaped front which is thrust into or beneath material to first gather the material and then direct the same into the range of action of the flights.

21. The combination with an endless conveyer having going and return sections in substantially the same horizontal plane, and provided with flights, of a conveyer-frame pivotally mounted between its ends and having its receiving and discharge ends longitudinally in line said receiving end extended forward of the range of action of the flights and forming a shovel-shaped extension which is thrust into or under the material to be gathered whereby the said material is caused to travel over said shovel extremity and into the range of action of the flights.

22. The combination of a wheeled support, a conveyer-frame thereon and pivoted between its ends, wheels mounted on said frame, a chain passing around said wheels in a plane parallel to said frame, said chain having its going and return sections lying in the same horizontal plane, and provided with laterally-projecting flights, a trough with which said flights coöperate, and an extension of the trough parallel with the longitudinal axis thereof and having an open end in order that said flights may engage and carry up any material which is forced upon the open end of the said trough into the range of action of the flights.

In testimony whereof I have hereunto set my hand in presence of two subscribing witnesses.

THOMAS McLEAN PARK.

Witnesses:
E. L. DAWSON,
E. H. WAUGH.